Nov. 2, 1926.  
A. E. SCHEIN  
1,605,289  
ACTIVE GYROSCOPIC STABILIZER  
Filed June 1, 1921  
2 Sheets-Sheet 1

Inventor  
ALEXANDER E. SCHEIN  
By his Attorney  
Herbert H. Thompson

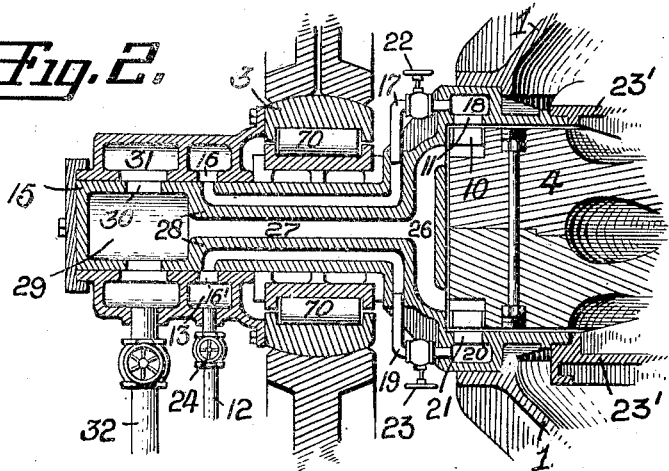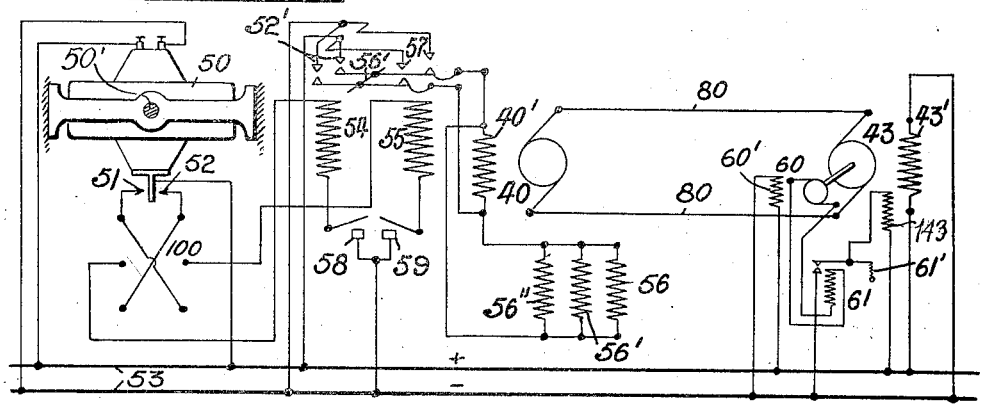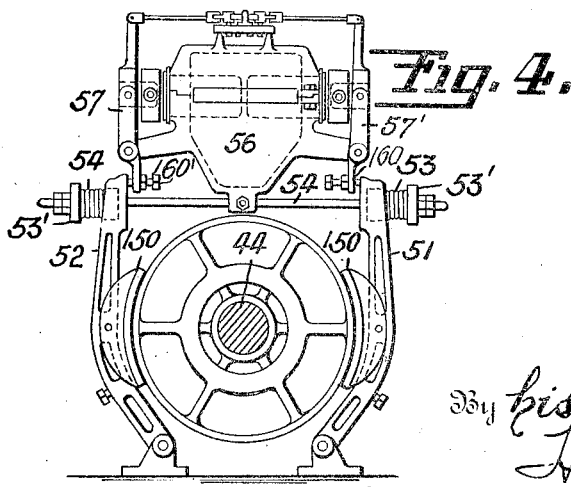

Patented Nov. 2, 1926.

1,605,280

UNITED STATES PATENT OFFICE.

ALEXANDER E. SCHEIN, OF NEW YORK, N. Y., ASSIGNOR TO THE SPERRY GYROSCOPE COMPANY, OF BROOKLYN, NEW YORK, A CORPORATION OF NEW YORK.

ACTIVE GYROSCOPIC STABILIZER.

Application filed June 1, 1921. Serial No. 474,292.

This invention relates to a driving operating unit for gyroscopic stabilizers for ships. The present practice for the operation of the gyroscopic stabilizer is to drive the rotor by an electric motor, preferably of the alternating current type and to employ a second electric motor generally of the direct current type for the precession engine for controlling the precession of the gyroscope. Owing to the great fluctuations in load on the precession motor and also the fact that alternating current is preferable for driving the rotor, it has been usual to provide a separate turbo-generator set for supplying the gyroscope with the needed electrical power instead of attempting to operate the same from the ship's mains.

The main purpose of this invention is to simplify and cheapen the cost of the operating equipment of the gyroscopic stabilizer by eliminating the necessity for employing a turbo-generator set and also preferably the employment of a heavy A. C. motor to drive the rotor. A further object of the invention is to improve the details of construction of the gyroscope, part of which has reference to the method employed herein for driving the rotor and other portions of which relate to the bearings of the gyroscope, both the rotor bearings and the precession gudgeons.

Referring to the drawings in which what I now consider to be the preferred forms of my invention are shown:

Fig. 2 is a detail section of one of the gudgeons of the stabilizer showing the manner in which steam or other working fluid is admitted to and exhausted from the casing of the gyroscope.

Fig. 3 is an elementary wiring diagram of the electrical equipment employed.

Fig. 4 is a side elevation of one of the brakes employed to control the precession of the gyroscope.

Figure 1:
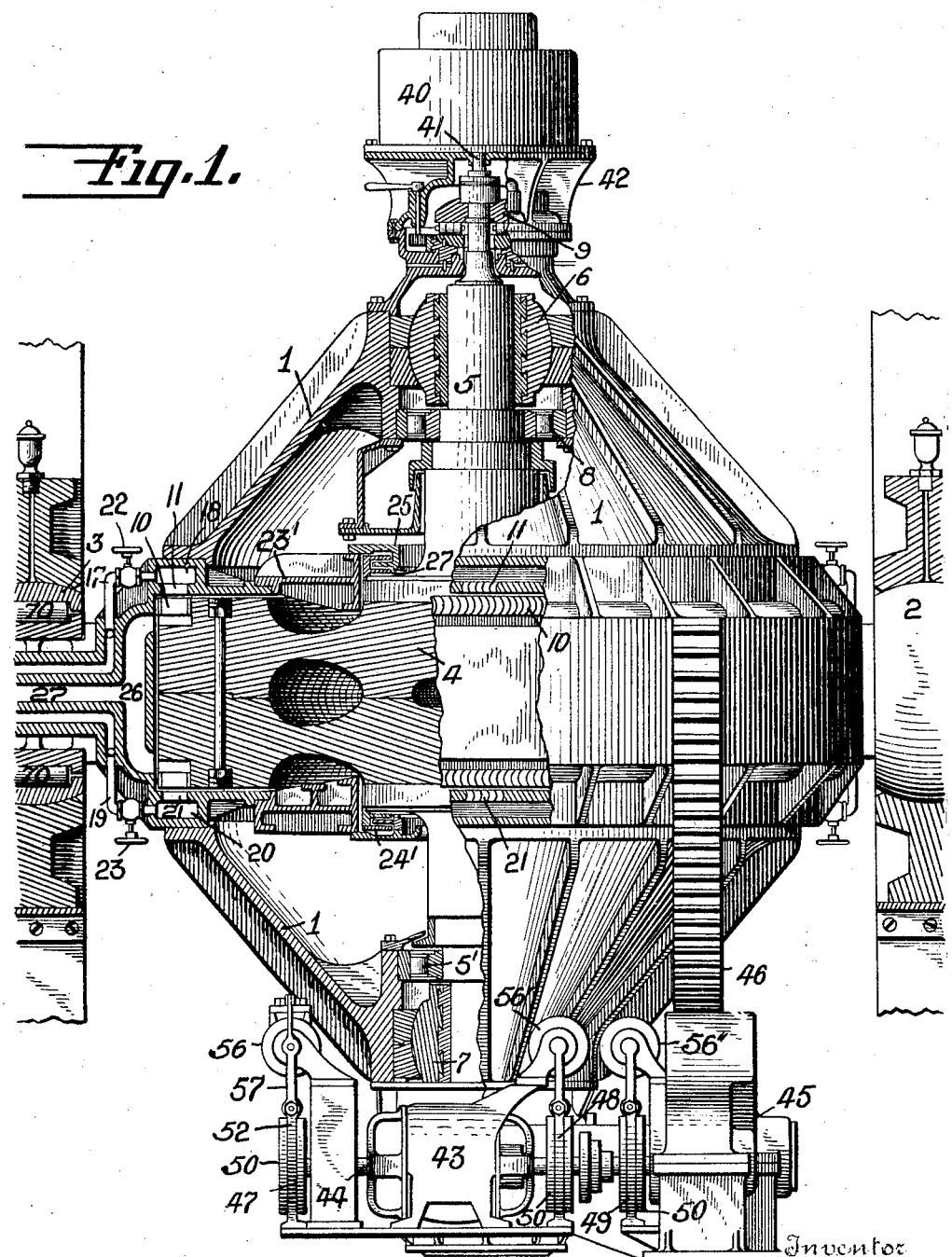
Fig. 1 is a vertical section partly in elevation of a gyroscopic stabilizer constructed according to my invention.

The gyroscope is shown as of the vertical type, the same consisting of a large rotor casing 1 journalled for oscillation about a horizontal axis in the gudgeons 2 and 3. The rotor proper 4 is secured to stub shafts 5 which are journalled in the vertical bearings 6 and 7 in the casing 1. Preferably, duplicate bearings 5' and 8 are provided for the shafts at each end, the main bearing 6 being of the ordinary plain bearing type while the auxiliary bearing 8 is of the antifriction or roller bearing type. The clearances of the bearings are so designed that the bearing 6 absorbs all of the normal load of the gyroscope, the roller bearing 8 being provided for emergencies only so that in case of failure of the main bearing the auxiliary bearing will come into operation until the gyroscope can be shut down for repair. The shaft 5 is shown as suspended from the anti-friction thrust bearing 9.

Instead of employing an electrical means to drive the rotor, as heretofore done, I prefer to drive the same directly by steam or other primary source of power. For this purpose I have shown the periphery of the rotor as provided with turbine blades 10, while adjacent the periphery thereof in the casing 1 I have placed one or more groups of nozzles or steam jets 11 which direct the steam against the turbine blades to rotate the rotor at the desired speed, the turbine being preferably of the reaction type as shown. The steam is shown as entering the gyroscope through a supply pipe 12 (Fig. 2) where it enters an annular chamber 13 surrounding the hollow trunnion 15 connected to the rotor case 1. Said trunnion and said chamber are both provided with apertures 16, 16' so that steam may flow readily from the chamber 13 into the interior of the hollow trunnion 15 from whence the steam is led by pipe 17 into the hollow annular member 18 connected with the groups of turbine blades 11 or nozzles around the rotor. Also connected to the interior of said hollow shaft 15 is a second pipe 19 which leads into a similar annular member 20 located on the opposite side of the rotor. Also on this side of the rotor is provided a duplicate set of turbine blades 21 which, however, are designed to operate the rotor in the opposite direction from nozzles 11. The principal purpose of the duplicate set of blades is, however, to quickly bring the heavy rotor to rest when so desired, in other words, to operate as a powerful brake. The direction of rotation of the gyroscope is controlled by any means such as valves 22 and 23 in pipes 17 and 19 respectively. The main valve 24 is shown in the pipe 12.

After passing through the blades on the rotor, the steam is led from the gyroscope through the passages 26 and out through the interior passageway 27 which lies within the hollow trunnion but is separated from the entering steam by the interior walls 28. From thence the steam passes into the chamber 29 in the outer end of the trunnion and out through the openings 30 therein into the annular chamber 31 in the gudgeon from whence the steam is led to a condenser or to the exhaust through pipe 32.

Preferably, the rotor is sealed by partitions 23' within the rotor casing not only to reduce windage losses but to prevent the steam and water from getting into the bearings. For this purpose a water seal 24' is provided at each side of the gyro rotor one portion of which 25 is secured to the plate 23' forming a part of the interior wall and the other portion of which 27 is secured to the hub of the rotor.

Not only does the turbine on the rotor wheel drive the gyro rotor but preferably also it supplies power for operating the precession motor. By employing the rotor driving means for this purpose is obtained the very important advantage of being able to utilize the flywheel effect of the gyro rotor to absorb the peak loads on the precession engine and at the same time to assist in braking the gyroscope about the precession axis by transferring the energy absorbed in braking the gyroscope to the gyro rotor. To effect the above purposes, I have shown a generator 40 which is shown as mounted on top of the gyroscope and directly connected to an extension 41 of the rotor shaft. The generator is shown as bolted or otherwise secured to a substantial bracket 42 secured to the top of the casing 1. Said generator is preferably separately excited and is connected to drive the precession motor 43.

Said motor is shown as mounted near the base of the gyroscope and is geared thereto, the shaft 44 thereof extending within the gear box 45 in which is provided a pinion (not shown) meshing with the large gear 46 on the gyro casing. Said motor shaft is also provided with a series of brake drums 47, 48 and 49 upon each of which operate powerful electrically controlled brake shoes 150. As shown in Fig. 4, the brakes comprise a pair of pivoted members 51 and 52 on each of which is a brake shoe 150. Said brakes are normally held against the brake drums by means of compression springs 53 and 54 each of which is mounted between one end of the lever 51 or 52 and a stop 53' adjustably secured to a rod 54.

Electro-magnetic means are provided for holding the brake shoes off the drums as long as a predetermined current is flowing. Such means is shown in each instance as a solenoid 56 which operates to draw inwardly a pair of armatures connected to links 57 and 57' when excited and thereby move outwardly the outer ends 160 and 160' of links which bear on the outer end of said arms 51 and 52 respectively. It will, therefore, be apparent that as long as the solenoid is able to overcome the action of the springs 53 and 54, the brake shoes can not be applied until the current of the solenoid falls below a predetermined amount, which event will apply the brake shoes with increasing force, until a maximum is reached with no current flowing. Both the motor and generator are designed for constant speed operation and are possessed of shunt or separately excited characteristics, so that when the precession motor is first started, and a heavy current required, the energy of the flywheel will absorb this peak load and assist the turbine in driving the generator at this period. On the other hand, if the speed of precession exceeds a predetermined amount, the motor 43 will be driven faster than normal and the E. M. F. produced by the motor 43 will exceed that produced by the generator 40. Therefore, the motor will become a generator and the generator a motor thus braking the gyroscope about the precessional axis and assisting in driving the rotor.

The preferred manner of carrying into effect the foregoing is illustrated in the wiring diagram of Fig. 3. In this diagram the control gyroscope 50 mounted for precession about vertical axis 50' governs the action of the main gyroscope, the precession motor being shown at 43 and the generator at 40. The control gyroscope actuates contacts 51 and 52 as it precesses one way or the other, as will be readily understood by those skilled in the art. A separate source of electrical supply, represented by lines 53 is provided for the auxiliary circuits and for the excitation of the separately excited fields 40' and 43' of the generator and motor respectively. The said contacts 51 and 52 are in circuit respectively with coils 54, 55 controlling the double relay 56', a reversing switch 100 being shown between the same so that the apparatus may be used either for stabilizing or rolling the ship, as is common in the art. A pair of contacts 57 on said relay, when closed, serves to send current in one direction through field 40' of the generator while the other pair of contacts 52' sends current in the opposite direction through said field, thereby reversing the E. M. F. in the generator-motor armature circuit 80.

The control of the precession motor 43 is then effected entirely through the control of the field of the generator 40, thereby eliminating the necessity of breaking heavy currents at the switches. Said coils 54 and 55 are also in circuit respectively with throwout switches 58 and 59 on the main gyroscope. Said switches are not shown in Fig. 1 but may be substantially similar to the switches shown in the patent to Sperry #1,342,397—"controlling mechanism for ships' gyroscopes", dated June 1, 1920, which break all circuits and apply the brakes when the limit of precession is reached in each direction. Also under the control of said relay and throwout switches are the three solenoids 56, 56′, 56″ for controlling the brakes.

It may be found in operation that the conversion of the precession motor into a generator and the generator into a motor to limit the precessional speed of the gyroscope is too sluggish to act effectively. In order to increase the sensitiveness of such action, applicant prefers to provide a very small auxiliary generator or magneto 60 actuated as the gyroscope precesses by being on the shaft of the precession motor, for instance. Said magneto is shown as having a separately excited field 60′ and as being in circuit with a relay 61. As soon as the E. M. F. of said generator exceeds a certain amount, the relay will be thrown against the action of spring 61′, thereby bringing into action an auxiliary field 143 on the motor to strengthen the field and increase the electro-motive force thereof, thereby increasing the braking action of the motor, which is acting at that time as a generator.

Heretofore, also it has been the practice to make stabilizing gyroscopes for ships decidedly pendulous chiefly to assist in centralizing the same, so that the gyroscope will have a natural tendency to normally maintain its vertical position. I have found, through many experiments, that such characteristic is undesirable for the reason that it makes the gyroscope more sluggish in action and requires more work on the part of the precession motor to accelerate the precession. The reason for this is that very often the precessional motor is called upon to accelerate the gyroscope when in an inclined position—in other words, against the action of gravity on the pendulous factor of the gyroscope. In practice it has been found that very often the precession motor is unable to perform this extra work and, therefore, a pendulous stabilizer under such conditions fails to operate. I prefer, therefore, to substantially balance the gyroscope about its horizontal gudgeons 2 and 3. The mounting of the generator on top of the casing 1 assists to this end since it helps balance the heavy lower thrust bearing, oil pump etc. at the bottom of the casing.

I also prefer to employ about the precessional axis of the main gyroscope roller bearings, as shown at 70. As the gyroscope continually precesses back and forth coming to rest at each reversal of precession, it is found that the static friction of plain bearings is so large as to seriously interfere with the operation of the gyroscope and by the use of roller bearings, said static friction is eliminated and more efficient operation secured.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination with a ship's gyroscope having a rotor and a precession controlling motor, of a prime mover connected to the rotor for driving the same, and a generator also connected to said rotor for supplying power to said precession motor.

2. The combination with a ship's gyroscope having a rotor and a precession controlling motor, of a prime mover connected to the rotor for driving the same, and a generator also connected to said rotor for supplying power to said precession motor, said motor being so designed that when the speed of precession exceeds a predetermined amount, said motor and generator will interchange their functions whereby the latter will assist in driving the rotor.

3. The combination with a ship's gyroscope having a rotor and a precession controlling motor, of means directly connected to the rotor for driving the same, and a generator for supplying power to said precession control motor, said generator being directly driven by said rotor driving means.

4. In a gyroscopic stabilizer employing a variable load precession motor, means for supplying the same with power and absorbing power from the same comprising a turbine, a generator and a fly wheel, the latter being the rotor of the gyroscope to which the turbine and generator are coupled.

5. In combination with the rotor of a gyroscope, a prime mover coupled to said rotor for spinning the same, and means for utilizing part of the energy of said rotor in precessing said gyroscope and for utilizing part of the energy of precession in driving said rotor.

6. The combination with a stabilizing or rolling gyroscope, of trunnions for mounting for oscillation about an axis, a rotor, a turbine for normally driving the rotor in one direction, and an oppositely acting turbine adapted to bring the rotor to rest.

7. The combination with a ship's gyroscope, of trunnions for mounting for oscillation about an axis, a rotor, a turbine for normally driving the rotor in one direction, an oppositely acting turbine adapted to bring the rotor to rest, and means for directing the driving fluid through either turbine at will.

8. In a gyroscopic stabilizer for ships, the combination with the flywheel and its housing, of trunnions for mounting the housing for oscillation about a horizontal axis, a reaction steam turbine for normally driving the flywheel, and means for leading the live steam in and the exhaust steam out through a trunnion.

9. The combination with a ship's gyroscope having a rotor and a precession controlling motor, of a prime mover connected to the rotor for driving the same, a generator also connected to said rotor for supplying power to said precession motor, and means for altering the relative E. M. F.'s of the motor and generator when the speed of precession exceeds a predetermined amount, whereby the motor becomes a regenerative brake.

10. In ship stabilizing apparatus, the combination with a main and a control gyroscope, of a precession motor for the former, a generator for supplying current to said motor, both said motor and generator having separately excited fields, an electro-magnetically controlled brake for the main gyroscope, and means under the control of said control gyroscope and said main gyroscope for exciting, killing or reversing the field of said generator and applying said brake.

11. In ship stabilizing apparatus, the combination with a main and a control gyroscope, of a precession motor for the former, means for driving the rotor of said main gyroscope, a generator driven by said rotor driving means, both said motor and generator having separately excited fields, and means under the control of said control gyroscope for exciting, killing or reversing the field of said generator.

12. In combination with the rotor of a gyroscope, a prime mover coupled thereto, for spinning the same, a precession motor, and means for utilizing part of the energy of said rotor in precessing said gyroscope and for utilizing part of the energy of precession in driving said rotor.

13. In combination with a ship's gyroscope having a rotor and a precession controlling motor, means for driving said rotor and precession motor including a generator, and means for strengthening the field of the motor when the speed of precession exceeds a predetermined amount, including an auxiliary generator connected to said motor and a relay operated thereby which controls the motor field.

14. In a gyroscopic stabilizer, the combination with the gyroscopic rotor or flywheel, of trunnions for mounting the gyroscope for oscillation about an axis, a steam turbine having the revoluble blades formed on said rotor, means for leading steam into said turbine through a trunnion, and means for leading the exhaust steam away from said turbine through the same trunnion.

15. The combination with a gyroscope, of a pair of turbines for driving the rotor in opposite directions, trunnions for mounting the same for oscillation about an axis, one of said trunnions being hollow with a plurality of passages therethrough, one of said passages being connected to supply steam to one of said turbines, another passage to supply steam to the other turbine, and the third passage being connected to exhaust steam from either turbine.

16. The combination with a ship's gyroscope having a rotor and a precession controlling motor, of means directly connected to the rotor for driving the same, a generator for supplying power to said precession control motor, said generator being directly driven by said rotor driving means, and means for causing said motor and generator to interchange their functions when the speed of precession exceeds a predetermined amount.

17. In a ship stabilizing apparatus, the combination with a main and a control gyroscope, of a precession motor for the former, a generator for supplying current to said motor, both said motor and generator having separately excited fields, an electro-magnetically controlled brake for the main gyroscope, means under the control of said control gyroscope and said main gyroscope for exciting, killing or reversing the field of said generator and applying said brake, and means controlled by the speed of precession for altering the motor field.

In testimony whereof I have affixed my signature.

ALEXANDER E. SCHEIN.